United States Patent
Yang et al.

(10) Patent No.: US 9,436,358 B2
(45) Date of Patent: Sep. 6, 2016

(54) SYSTEMS AND METHODS FOR EDITING THREE-DIMENSIONAL VIDEO

(71) Applicant: Cyberlink Corp., Shindian, Taipei (TW)

(72) Inventors: Chia-Che Yang, New Taipei (TW); Chun Ming Yeh, Taipei (TW)

(73) Assignee: CYBERLINK CORP., Shindian, Taipei (TW)

( * ) Notice: Subject to any disclaimer, the term of this patent is extended or adjusted under 35 U.S.C. 154(b) by 357 days.

(21) Appl. No.: 13/788,203

(22) Filed: Mar. 7, 2013

(65) Prior Publication Data
US 2014/0258867 A1 Sep. 11, 2014

(51) Int. Cl.
*G06F 3/0484* (2013.01)

(52) U.S. Cl.
CPC .................................. *G06F 3/0484* (2013.01)

(58) Field of Classification Search
CPC . H04N 5/2226; G06T 7/0051; G06T 7/0042; G06T 3/0037; G11B 27/031; G11B 20/10; B44F 7/00
See application file for complete search history.

(56) References Cited

U.S. PATENT DOCUMENTS

| | | | | |
|---|---|---|---|---|
| 5,760,773 A * | 6/1998 | Berman | ................ | G06F 1/1626 345/672 |
| 5,917,937 A | 6/1999 | Szeliski et al. | | |
| 6,571,024 B1 | 5/2003 | Sawhney et al. | | |
| 6,606,105 B1 * | 8/2003 | Quartetti | ............... | G06F 3/0481 715/203 |
| 6,674,484 B1 | 1/2004 | Boland et al. | | |
| 7,046,732 B1 * | 5/2006 | Slowe | ..................... | H04N 19/20 347/154 |
| 7,965,866 B2 * | 6/2011 | Wang | ................. | G06K 9/00771 382/103 |
| 8,543,922 B1 * | 9/2013 | Niles | ..................... | G06F 3/0483 715/716 |
| 2006/0022983 A1 * | 2/2006 | Gauthier et al. | ............... | 345/473 |
| 2008/0040766 A1 * | 2/2008 | Anandpura et al. | .......... | 725/131 |
| 2009/0262238 A1 * | 10/2009 | Hope | .................... | G11B 27/034 348/441 |
| 2010/0086221 A1 * | 4/2010 | Stankiewicz | ........ | G06K 9/4671 382/224 |
| 2010/0122168 A1 | 5/2010 | Silberstein et al. | | |
| 2010/0134601 A1 * | 6/2010 | Lefevre | ................. | G06T 7/0046 348/51 |
| 2010/0211924 A1 * | 8/2010 | Begel et al. | ................... | 717/101 |
| 2011/0109730 A1 * | 5/2011 | Aubey, Jr. | ............ | H04N 13/007 348/51 |
| 2011/0181521 A1 * | 7/2011 | Reid et al. | ..................... | 345/173 |
| 2012/0056874 A1 * | 3/2012 | Kim et al. | ..................... | 345/419 |
| 2012/0100915 A1 * | 4/2012 | Margalit | ................. | A63F 13/10 463/31 |

(Continued)

OTHER PUBLICATIONS

Waschbusch et al. "Interactive 3D Video Editing" The Visual Computer 22 (9-11):631-641 (2006).

(Continued)

*Primary Examiner* — Alvin Tan
*Assistant Examiner* — Mandrita Brahmachari
(74) *Attorney, Agent, or Firm* — McClure, Qualey & Rodack, LLP

(57) ABSTRACT

Various embodiments are disclosed for editing a video sequence. One embodiment, among others, is a method for editing a video in a video editing system. The method comprises obtaining a video sequence and identifying objects in the video sequence with corresponding depth information, displaying the video sequence in a display panel in a user interface, and facilitating insertion of an object into the video sequence by displaying in the user interface, a timeline and a control panel including a graphical representation for each of the identified objects with corresponding depth information. The graphical representations are arranged relative to the timeline and based on the corresponding depth information. The method further comprises obtaining input from a user positioning the object into the video sequence relative to the identified objects with corresponding depth information.

23 Claims, 15 Drawing Sheets

(56) References Cited

U.S. PATENT DOCUMENTS

| | | | |
|---|---|---|---|
| 2012/0249746 A1* | 10/2012 | Cornog et al. | 348/47 |
| 2012/0288155 A1* | 11/2012 | Dhawan | G06T 7/2033 382/103 |
| 2014/0068664 A1* | 3/2014 | Bourne | H04N 21/23412 725/35 |
| 2014/0115470 A1* | 4/2014 | Meaney et al. | 715/719 |

OTHER PUBLICATIONS

Karsch et al. "Rendering Synthetic Objects into Legacy Photographs" University of Illinois at Urbana-Champaign, 2011.

Autodesk, Discreet Smoke 7. Aug. 10, 2005.

* cited by examiner

SYSTEMS AND METHODS FOR EDITING THREE-DIMENSIONAL VIDEO

BACKGROUND

With the ever-growing amount of digital media content available to consumers through the Internet and other sources, consumers have access to a vast amount of content. Many individuals turn to video editing tools to incorporate customized special effects into videos. While many video editing tools are available, however, incorporating special effects into a video sequence can still be a complex and time-consuming task.

SUMMARY

Briefly described, one embodiment, among others, is a method for editing a video in a video editing system. The method comprises obtaining a video sequence and identifying objects in the video sequence with corresponding depth information, displaying the video sequence in a display panel in a user interface, and facilitating insertion of an object into the video sequence by displaying in the user interface, a timeline and a control panel including a graphical representation for each of the identified objects with corresponding depth information. The graphical representations are arranged relative to the timeline and based on the corresponding depth information. The method further comprises obtaining input from a user positioning the object into the video sequence relative to the identified objects with corresponding depth information.

Another embodiment is a system for editing a video. The system comprises a media interface configured to obtain a video sequence, an object analyzer configured to identify objects in the video sequence with corresponding depth information, and a user interface component configured to display the video sequence in a display panel in a user interface, where the user interface is further configured to display in the user interface, a timeline and a control panel including a graphical representation for each of the identified objects with corresponding depth information. The graphical representations are arranged relative to the timeline and based on the corresponding depth information. The system further comprises a special effects editor configured to apply a special effect to the video sequence, wherein the special effect comprises positioning of an object into the video sequence relative to the identified objects with corresponding depth information.

Another embodiment is a non-transitory computer-readable medium embodying a program executable in a computing device, comprising code that obtains a video sequence and identifies objects in the video sequence with corresponding depth information, code that displays the video sequence in a display panel in a user interface, and code that displays in the user interface, a timeline and a control panel including a graphical representation for each of the identified objects with corresponding depth information, wherein the graphical representations are arranged relative to the timeline and based on the corresponding depth information. The program further comprises code that obtains input from a user positioning the object into the video sequence relative to the identified objects with corresponding depth information.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Various embodiments are described for providing users with an intuitive user interface for facilitating the editing of a video. In accordance with one embodiment, a video sequence is obtained and objects in the video sequence with corresponding depth information are identified. The video sequence is displayed in a display panel in a user interface. To facilitate the insertion of one or more objects into the video sequence, a timeline and a control panel are displayed to the user, where the control panel includes a graphical representation for each of the identified objects with corresponding depth information.

For various embodiments, the graphical representations are arranged relative to the timeline and based on the corresponding depth information, thereby providing the user with a means for navigating and inserting the one or more objects into the video sequence. User input is obtained for specifying where to position the one or more objects into the video sequence where the one or more objects are positioned relative to the identified objects with corresponding depth information.

Figure 1A:
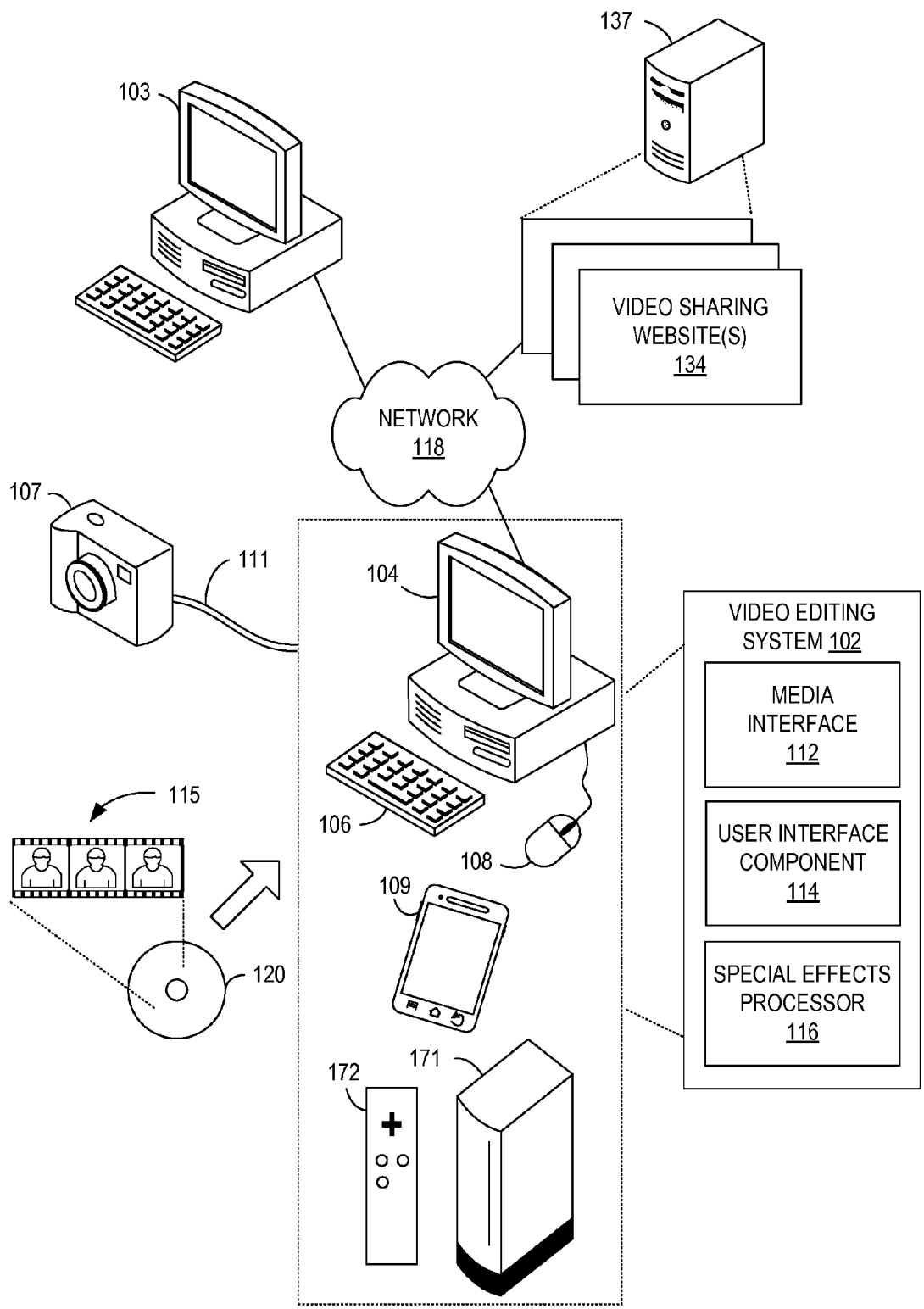
FIG. 1A is a block diagram of a video editing system for facilitating video editing in accordance with various embodiments of the present disclosure.

A description of a system for facilitating video editing is now described followed by a discussion of the operation of the components within the system. FIG. 1A is a block diagram of a video editing system 102 in which embodiments of the video editing techniques disclosed herein may be implemented. The video editing system 102 may be embodied, for example, as a desktop computer, computer workstation, laptop, a smartphone 109, a tablet, or other computing platform that includes a display 104 and may include such input devices as a keyboard 106 and a mouse 108.

For embodiments where the video editing system 102 is embodied as a smartphone 109 or tablet, the user may interface with the video editing system 102 via a touch-screen interface (not shown). In other embodiments, the video editing system 102 may be embodied as a video gaming console 171, which includes a video game controller 172 for receiving user preferences. For such embodiments, the video gaming console 171 may be connected to a television (not shown) or other display 104.

The video editing system 102 is configured to retrieve, via the media interface 112, digital media content 115 stored on a storage medium 120 such as, by way of example and without limitation, a compact disc (CD) or a universal serial bus (USB) flash drive, wherein the digital media content 115 may then be stored locally on a hard drive of the video editing system 102.

As one of ordinary skill will appreciate, the digital media content 115 may be encoded in any of a number of formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

As depicted in FIG. 1A, the media interface 112 in the video editing system 102 may also be configured to retrieve digital media content 115 directly from a digital camera 107 where a cable 111 or some other interface may be used for coupling the digital camera 107 to the video editing system 102. The video editing system 102 may support any one of a number of common computer interfaces, such as, but not limited to IEEE-1394 High Performance Serial Bus (Firewire), USB, a serial connection, and a parallel connection.

The digital camera 107 may also be coupled to the video editing system 102 over a wireless connection or other communication path. The video editing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the video editing system 102 may receive digital media content 115 from another computing system 103. Alternatively, the video editing system 102 may access one or more video sharing websites 134 hosted on a server 137 via the network 118 to retrieve digital media content 115.

The user interface component 114 in the video editing system 102 is configured to generate a user interface for facilitating the insertion and positioning of objects into the digital media content 115, where the user may adjust the depth of the inserted objects relative to other existing objects in the digital media content 115. In the context of this disclosure, the one or more objects inserted into the digital media content 115 may refer to any kind of graphic, text, or other special effect. The user interface generated by the user interface component 114 facilitates the insertion of the objects by providing graphical representations of existing objects in the digital media content 115 that have corresponding depth information.

By positioning the inserted object based on the graphical representations corresponding to existing objects, the user may adjust the depth of the inserted object, thereby controlling whether the object is occluded and/or occludes existing objects in the digital media content 115. The special effects processor 116 is configured to apply the special effects created by the used by inserting the objects into the digital media content 115 according to the depth specified by the user for the objects to be inserted.

Figure 1B:
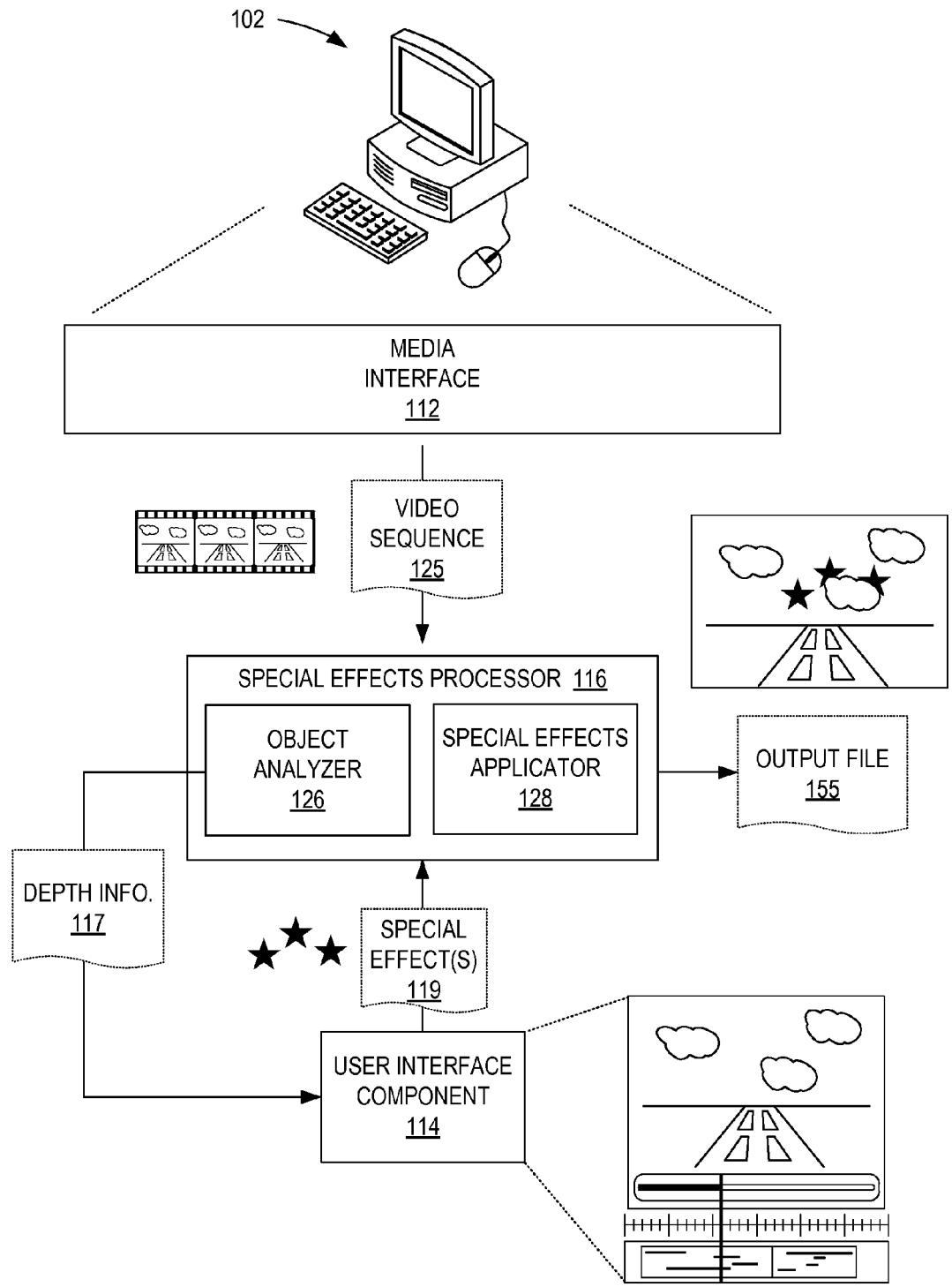
FIG. 1B illustrates various components of the special effects processor in the video editing system of FIG. 1A in accordance with various embodiments of the present disclosure.

Reference is made to FIG. 1B, which illustrates various components of the special effects processor 116 in FIG. 1A. As shown, the special effects processor 116 further comprises an object analyzer 126 and a special effects applicator 128. In operation, the object analyzer 126 in the special effects processor 116 receives a video sequence 125 comprising a plurality of frames obtained by the media interface 112 and determines whether the video sequence 125 includes one or more existing objects with corresponding depth information 117 for specifying the spatial relationship among the existing objects. In particular, the depth information may specify such information as a depth distance of a particular object from the camera.

For some embodiments, the user interface component 114 generates a user interface based on depth information 117 identified by the object analyzer 126, where the generated user interface facilitates insertion of graphics, text, and/or other special effects by allowing users to navigate among objects within the video sequence 125 with corresponding depth information. The user interface component 114 obtains user input specifying positioning of objects to be inserted into the video sequence 125. As discussed in more detail below, such positioning includes a relative depth of the objects to be inserted, where the objects to be inserted may be positioned in front of certain existing objects and behind other existing objects in the video sequence 125. The special effects 119 specifying the objects to be inserted and the relative positioning of the objects are forwarded to the special effects applicator 128, which then incorporates the special effects 119 into the video sequence 125 and generates an output file 155.

Figure 2:
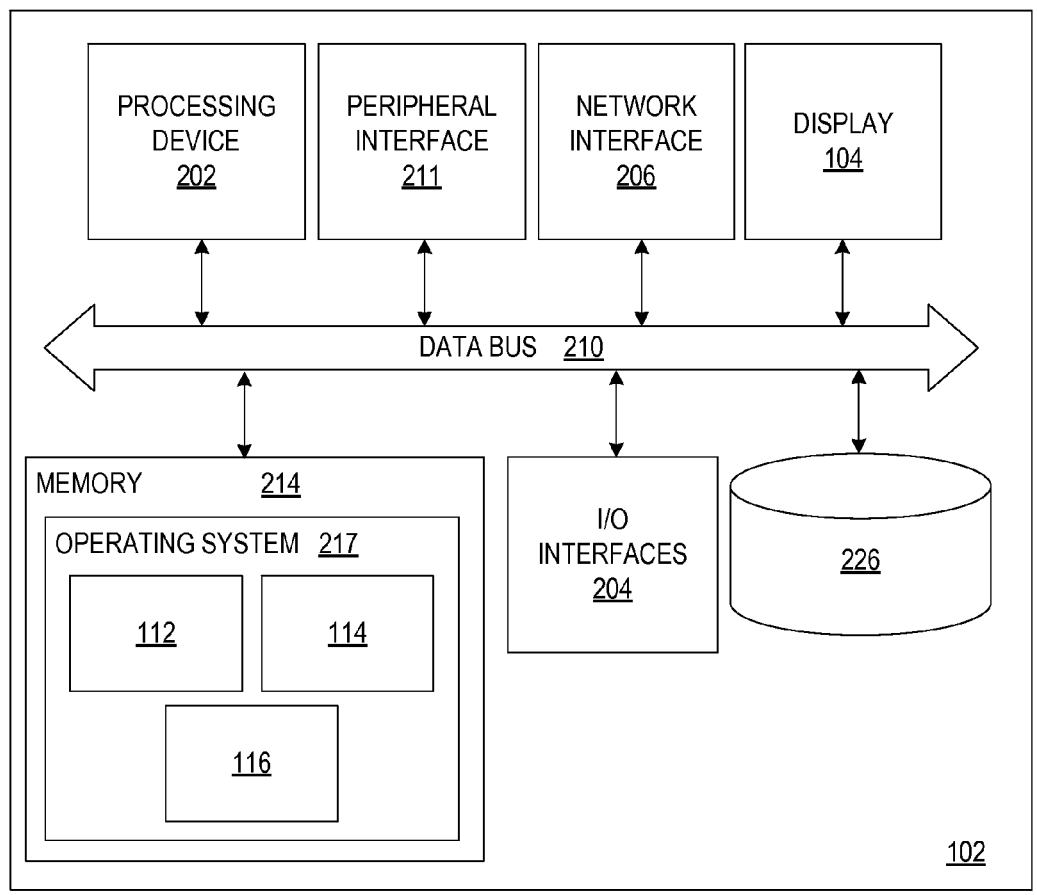
FIG. 2 is a detailed view of the video editing system device of FIG. 1A in accordance with various embodiments of the present disclosure.

FIG. 2 is a schematic diagram of the video editing system 102 shown in FIG. 1A. The video editing system 102 may be embodied in any one of a wide variety of wired and/or wireless computing devices, such as a desktop computer, portable computer, dedicated server computer, multiprocessor computing device, smartphone 109 (FIG. 1A), tablet computing device, and so forth. As shown in FIG. 2, the video editing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the video editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (media interface 112, user interface component 114, special effects processor 116) of the video editing system 102 depicted in FIG. 1A. In accordance with such embodiments, the components are stored in memory 214 and executed by the processing device 202. One of ordinary skill in the art will appreciate that the memory 214 can, and typically will, comprise other components which have been omitted for purposes of brevity.

In this regard, the term "executable" may refer to a program file that is in a form that can ultimately be run by the processing device 202. Examples of executable programs may be, for example, a compiled program that can be translated into machine code in a format that can be loaded into a random access portion of the memory 214 and run by the processing device 202, source code that may be expressed in proper format such as object code that is capable of being loaded into a random access portion of the memory 214 and executed by the processing device 202, or source code that may be interpreted by another executable program to generate instructions in a random access portion of the memory 214 to be executed by the processing device 202, etc. An executable program may be stored in any portion or component of the memory 214 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Input/output interfaces 204 provide any number of interfaces for the input and output of data. For example, where the video editing system 102 comprises a personal computer, these components may interface with one or more user input devices via the I/O interfaces 204, where the user input devices may comprise a keyboard 106 (FIG. 1A) or a mouse 108 (FIG. 1A). The display 104 may comprise a computer monitor, a plasma screen for a PC, a liquid crystal display (LCD), a touchscreen display, or other display device 104.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The video editing system 102 may communicate with one or more computing devices via the network interface 206 over the network 118 (FIG. 1A). The video editing system 102 may further comprise mass storage 226. The peripheral interface 211 supports various interfaces including, but not limited to IEEE-1294 High Performance Serial Bus (Firewire), USB, a serial connection, and a parallel connection.

Figure 3:
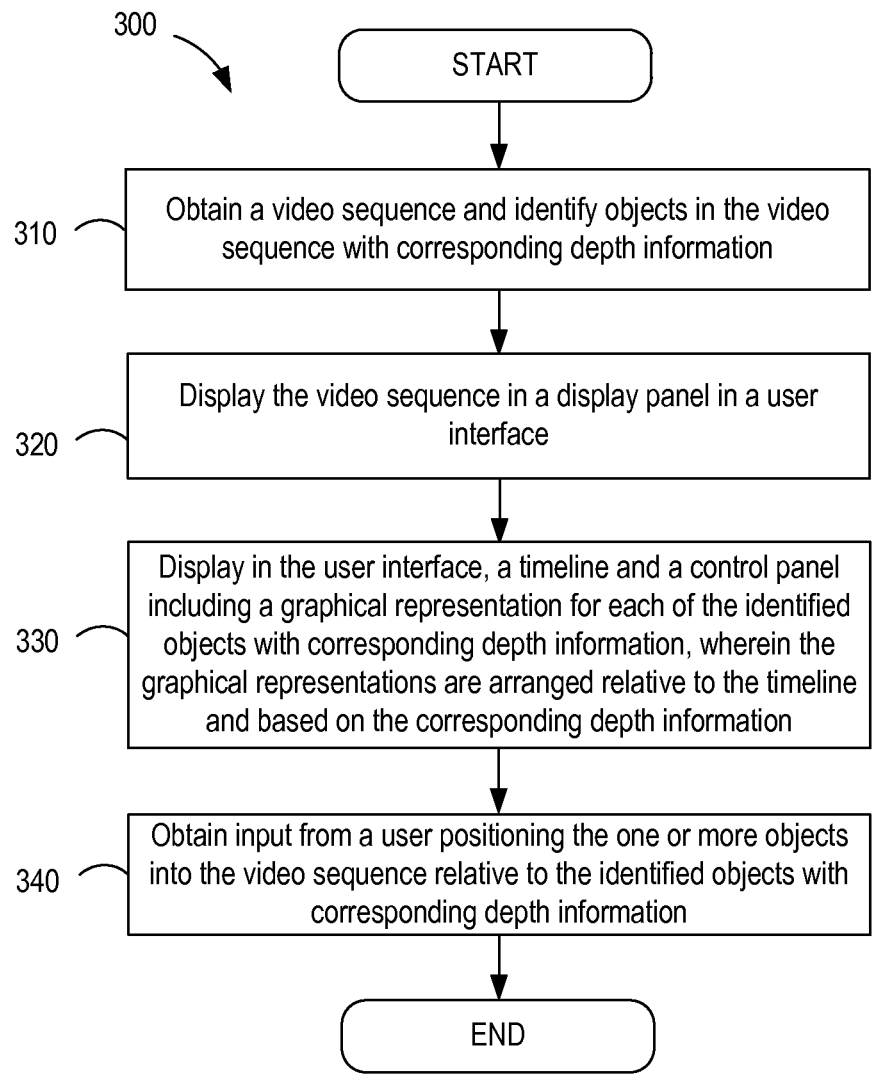
FIG. 3 is a top-level flowchart illustrating examples of functionality implemented as portions of the video editing system of FIG. 1 for facilitating video editing according to various embodiments of the present disclosure.
Figure 4:
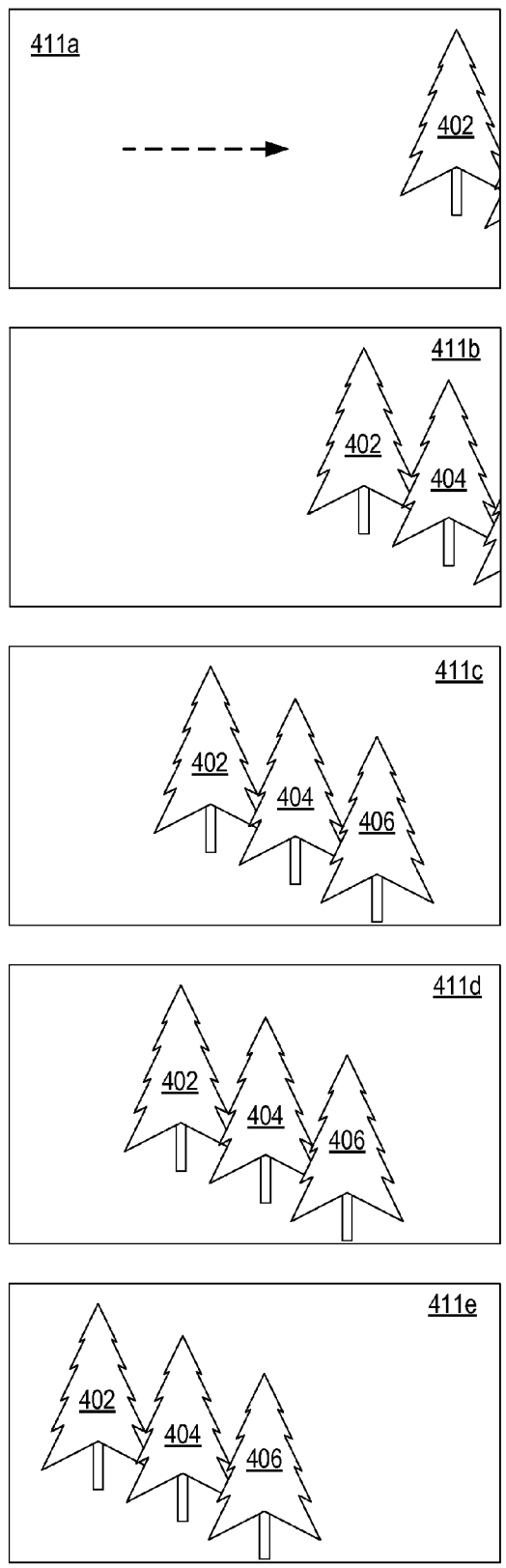
FIG. 4 illustrates panning during playback of a video sequence.

Reference is made to FIG. 3, which is a flowchart 300 in accordance with one embodiment for facilitating automatic image editing performed by the video editing system 102 of FIG. 1A. It is understood that the flowchart 300 of FIG. 3 provides merely an example of the many different types of functional arrangements that may be employed to implement the operation of the various components of the video editing system 102 (FIG. 1A). As an alternative, the flowchart of FIG. 3 may be viewed as depicting an example of steps of a method implemented in the video editing system 102 according to one or more embodiments.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

Beginning with block 310, a video sequence 125 (FIG. 1B) to be edited is obtained by the media interface 112 (FIG. 1A), and the object analyzer 126 (FIG. 1B) in the special effects processor 116 (FIG. 1A) analyzes attributes of the video sequence 125. This may comprise, for example, determining whether the video sequence 125 includes one or more existing objects with corresponding depth information.

In block 320, the user interface component 114 (FIG. 1B) displays the video sequence 125 in a display panel in a user interface. In block 330, the user interface component 114 facilitates insertion of one or more objects into the video sequence by displaying in the user interface, both a timeline component and a control panel to the user, where the control panel includes a graphical representation of each of the identified objects with corresponding depth information. Furthermore, the graphical representations are arranged relative to the timeline and based on the corresponding depth information. The one or more objects to be inserted into the video sequence 125 may comprise, for example and without limitation, graphics, text, and/or other special effects.

In block 340, the user interface component 114 obtains user input that specifies positioning the one or objects into the video sequence 125 relative to the identified objects with corresponding depth information. The special effects applicator 128 (FIG. 1B) applies the special effects to the video sequence 125 to generate an output file 155 (FIG. 1B).

To further illustrate various aspects of the video editing techniques disclosed, reference is made to FIGS. 4-11, which illustrates the operation of the various components of the video editing system 102. Before describing various elements associated with the user interface for various embodiments, reference is made to FIG. 4, which illustrates panning during playback of a video sequence. In the illustration shown, various frames 411*a-e* of a video sequence are shown where the camera pans from left to right. In each successive frame, various objects 402, 404, 406 come into view. Furthermore, assume for purpose of illustration, that each of the objects 402, 404, 406 contains corresponding depth information.

In accordance with some embodiments, the media interface 112 (FIG. 1B) obtains a video sequence 125 and analyzes the depth information corresponding to the objects within the video sequence 125. To further facilitate the insertion of objects, the media interface 112 may be configured to first divide a video sequence 125 into smaller video sequences (i.e., sub-videos) according to scene changes, where a scene change corresponds to at least a change in depth of at least one object in the video sequence. For example, two individuals switching positions relative to the camera or a vehicle moving towards the camera results in a change in the depth relationship of the objects with respect to other objects in the video sequence 125. Therefore, the time instance in which such an event occurs would be designated as a scene change. For some embodiments, the media interface 112 to partition the video sequence 125 into smaller video sequences according to these scene changes. The user may then insert objects into the smaller video sequences.

Figure 5:
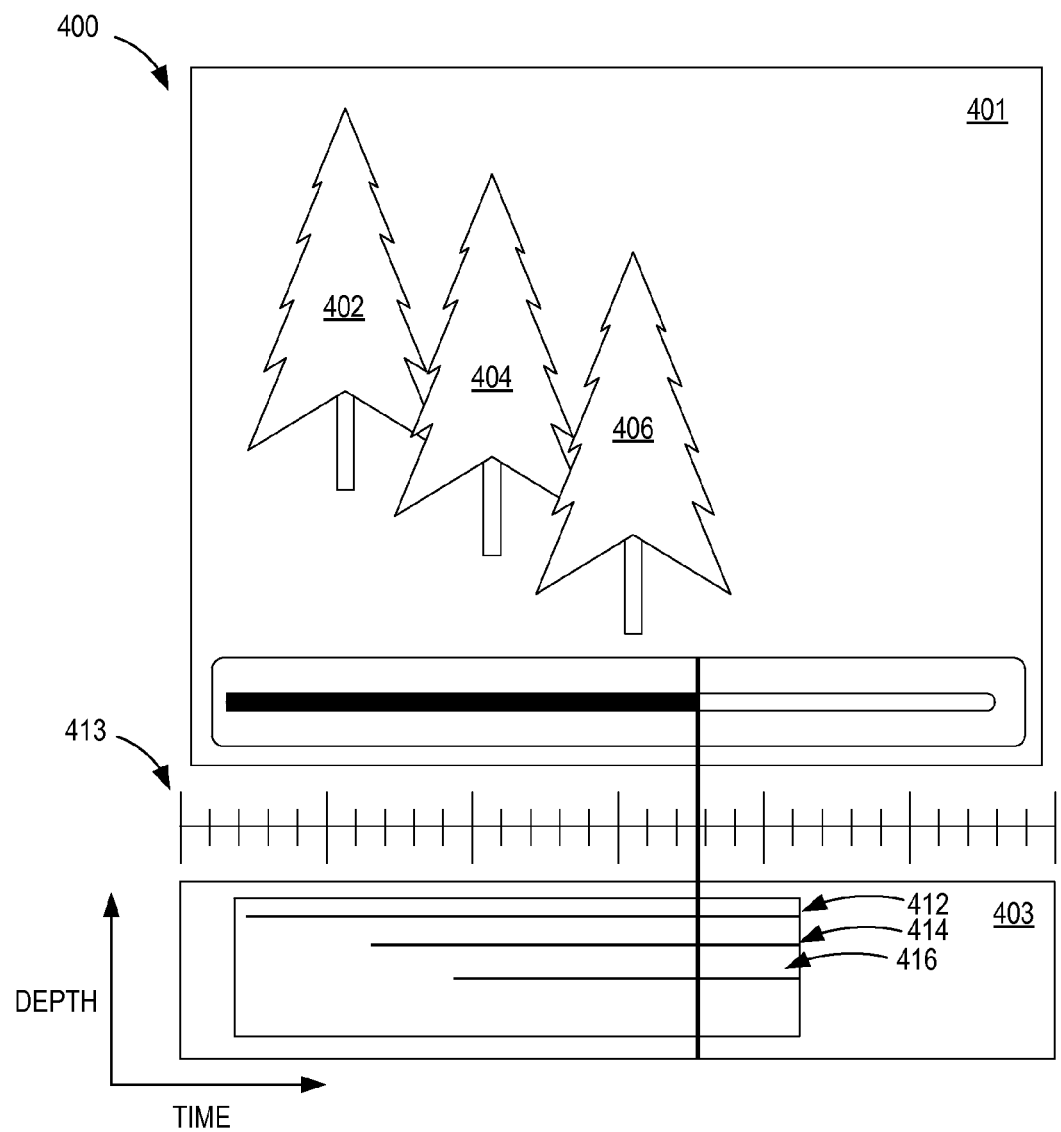
FIG. 5 is an example of a user interface generated by the video editing system in FIG. 1A for facilitating video editing in accordance with various embodiments of the present disclosure.

Turning now to FIG. 5, shown in an example of a user interface 400 generated by the video editing system 102 (FIG. 1A) for facilitating video editing. In the exemplary embodiment shown, the user interface 400 includes a display panel 401 for displaying a video sequence during playback. As shown, the video sequence includes a series of existing objects 402, 404, 406.

The user interface 400 further includes a timeline component 413 and a control panel 403 that includes graphical representations 412, 414, 416 of the existing objects 402, 404, 406 in the video sequence. In accordance with some embodiments, the graphical representations graphical representations 412, 414, 416 comprise lines where positioning of the lines within the control panel 403 correspond to a relative depth of the corresponding object 402, 404, 406.

In the example shown, the graphical representation 412 at the top of the control panel 403 represents the object 402 farthest away from the camera, while the graphical representation 416 at the bottom of the control panel 403 represents the object 406 closest to the camera. As illustrated by the relative positioning of the remaining graphical representation 414, the corresponding object 404 is positioned at an intermediate depth distance from the camera.

Furthermore, the respective lengths of the lines 412, 414, 416 correspond to the time in which the corresponding objects 402, 404, 406 appear in the display panel 401. Assume, for purposes of illustration, the camera pans from left to right, thereby resulting in the left-most object 402 being displayed first, followed by the next object 404, and so on, as illustrated earlier in FIG. 4. Based on this timing relationship, the length of each line 412, 414, 416 is set accordingly in the control 403. In this regard, the graphical representations 412, 414, 416 in the control panel 403 are positioned according to a first axis representing the depth of each object. The graphical representations 412, 414, 416 further extend along a second axis representing the time in which each object is shown in the display panel 401.

Figure 6:
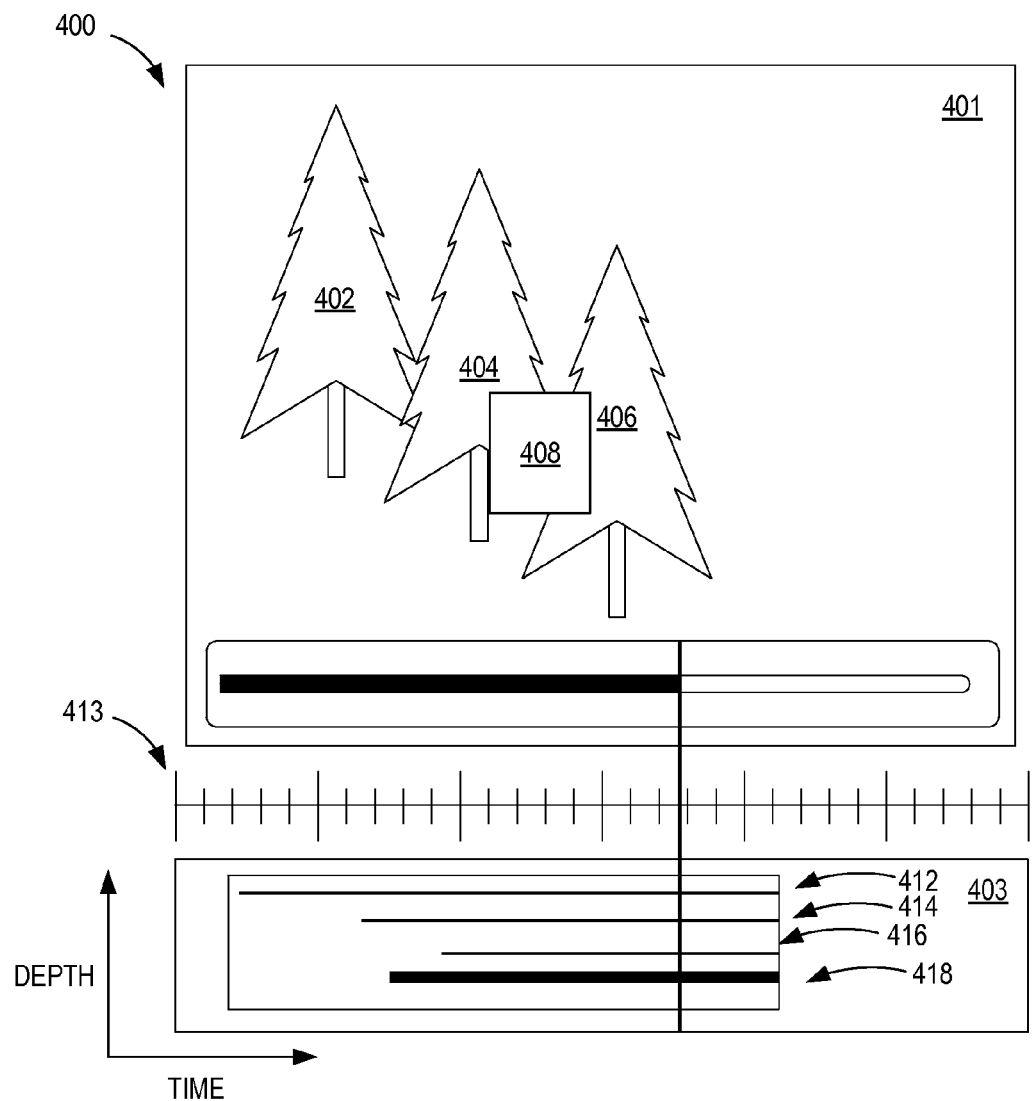
FIG. 6 is an example where the user wishes to modify the video sequence by inserting an object.

Shown in FIG. 6 is an example where the user wishes to modify the video sequence by inserting an object 408 (i.e., a box object for this example). Note that the inserted object 408 may comprise a new object which is not found in the original video sequence, where the inserted object may be selected from a database of special effects, objects, images, and so on. Note, however, that the inserted object 408 may also comprise an object extracted from the original video sequence. In such instances, the inserted object 408 will typically comprise a copy of the object found in the original video sequence.

In this example, the user wishes to insert an object 408 among the existing objects 402, 404, 406 in the video sequence. Furthermore, the user wishes to move the inserted object 408 in front of all the existing objects 402, 404, 406, as illustrated in the display panel 401. The user can insert the box object 408 by inserting a corresponding graphical representation 418 into the control panel 403. As shown, the user inserts the box object 408 by manipulating the corresponding graphical representation 418 such that the box object 408 is closest to the camera relative to the existing objects 402, 404, 406. The control panel 403 allows the user to adjust the depth distance of the inserted object 408 from the camera relative to the existing objects 402, 404, 406. The user may also adjust the duration in which the inserted object 408 is viewed by extending the length of the graphical representation 418 along the time axis of the control panel 403.

Figure 7:
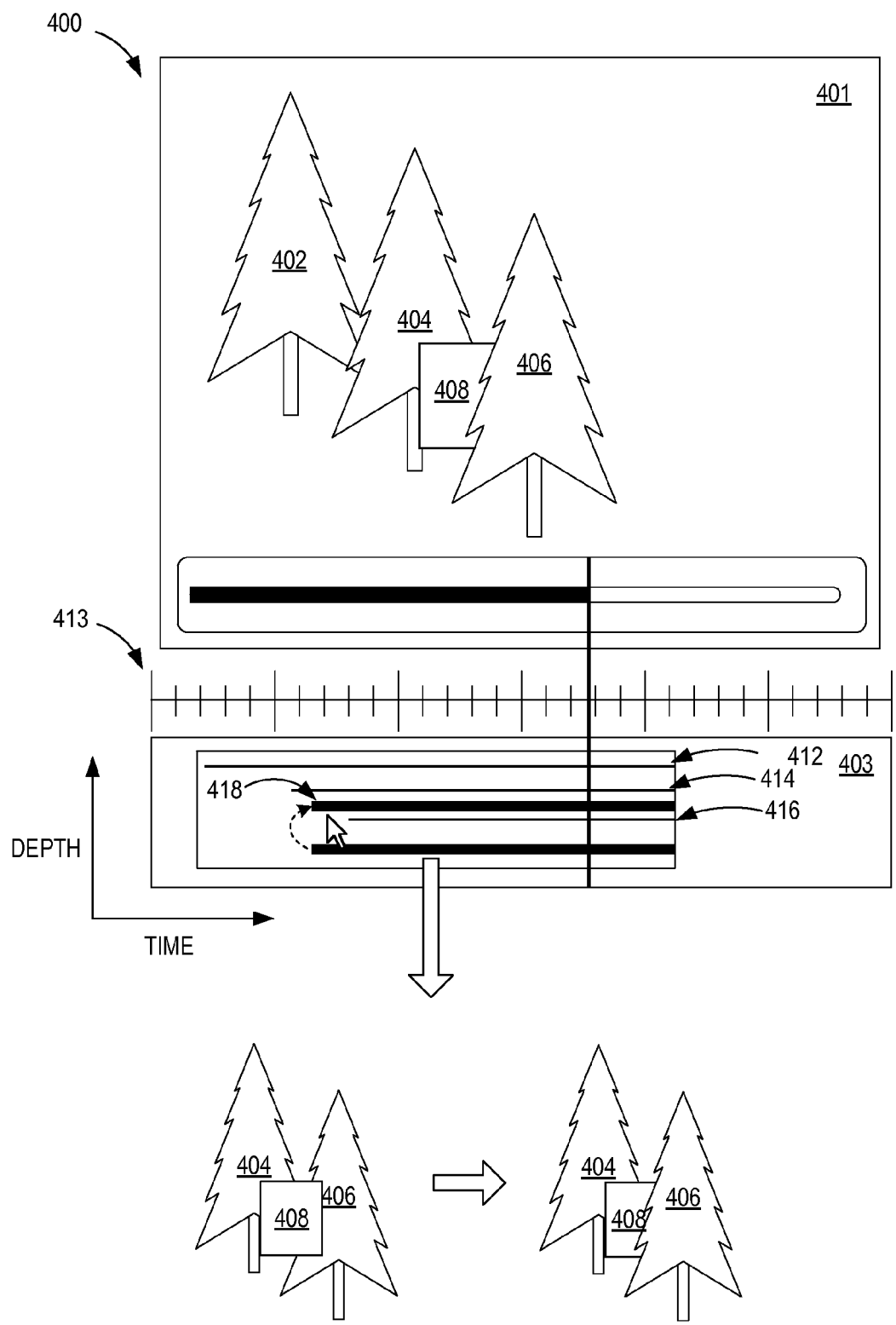
FIG. 7 illustrates how the user adjusts the depth distance of the inserted object shown in FIG. 6 by adjusting the corresponding graphical representation in the control panel in accordance with various embodiments of the present disclosure.

FIG. 7 illustrates how the user adjusts the depth distance of the inserted object 408 shown in FIG. 6 by adjusting the corresponding graphical representation 418 in the control panel 403. In the example shown, the user elects to move the inserted object 408 from a position in front of all the existing objects 402, 404, 406 to a position between object 404 and object 406. The user accomplishes this by dragging the corresponding graphical representation 418 to the desired depth distance, as shown in FIG. 7. Upon repositioning the graphical representation 418, the corresponding object 408 is repositioned accordingly.

Figure 8A:
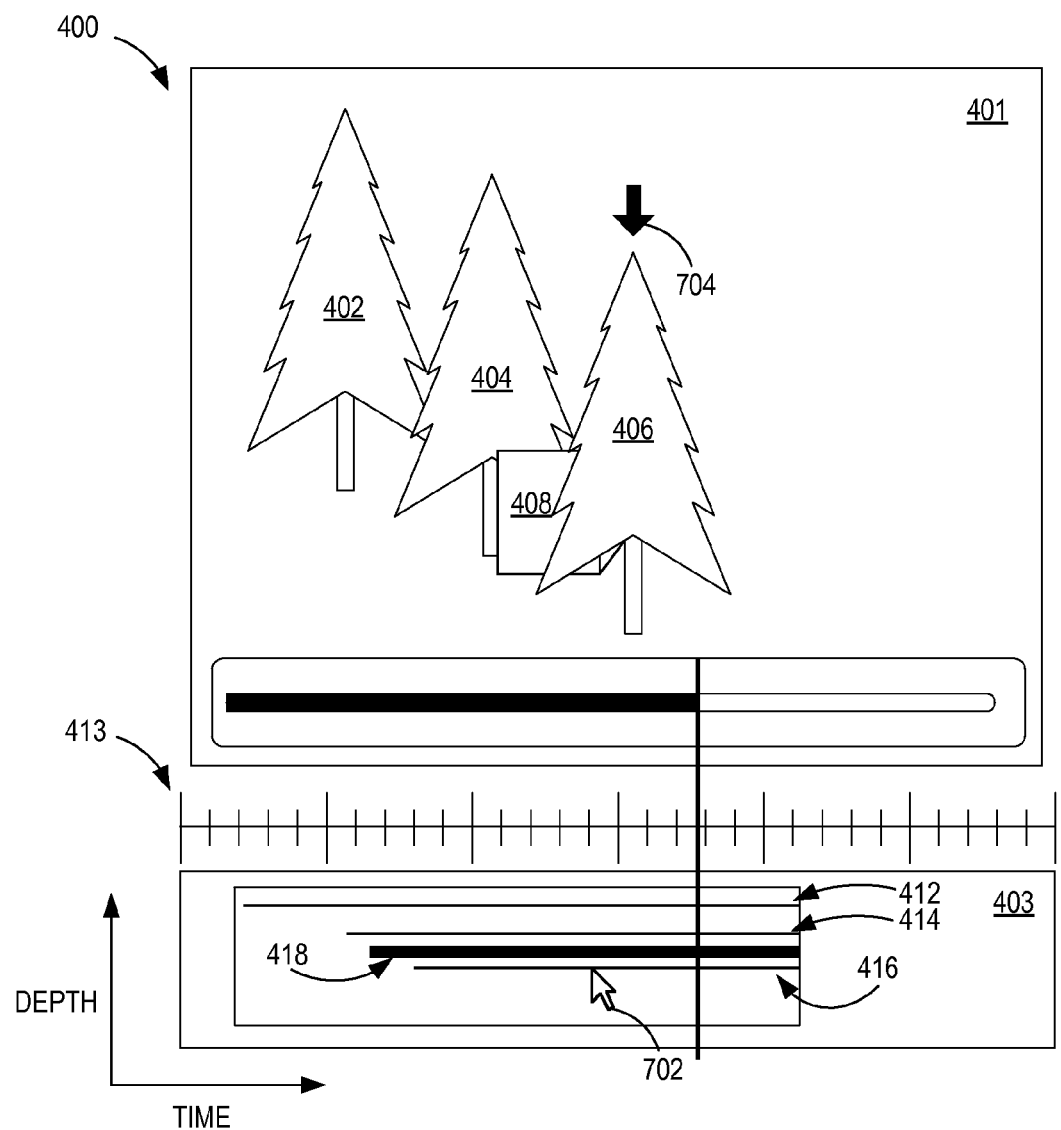
FIGS. 8A, 8B, and 8C illustrate various aspect of a highlighting feature associated with the example user interface of FIG. 6 in accordance with various embodiments of the present disclosure.

FIG. 8A illustrates a highlighting feature associated with the example user interface 400 of FIG. 6. To further facilitate the video editing process, the user interface component 114 (FIG. 1B) may be further configured to display an indicator in the display panel 401 that highlights the object being selected via the control panel 403. In the example shown, the user uses the mouse pointer 702 to select graphical representation 416. Note that this is just one example and that for some embodiments, the user may use a touchscreen interface to navigate and select items in the control panel 403. The corresponding object 406 is then highlighted by displaying an indicator 704 on or near the object 406, as shown in FIG. 8A.

Figure 8B:
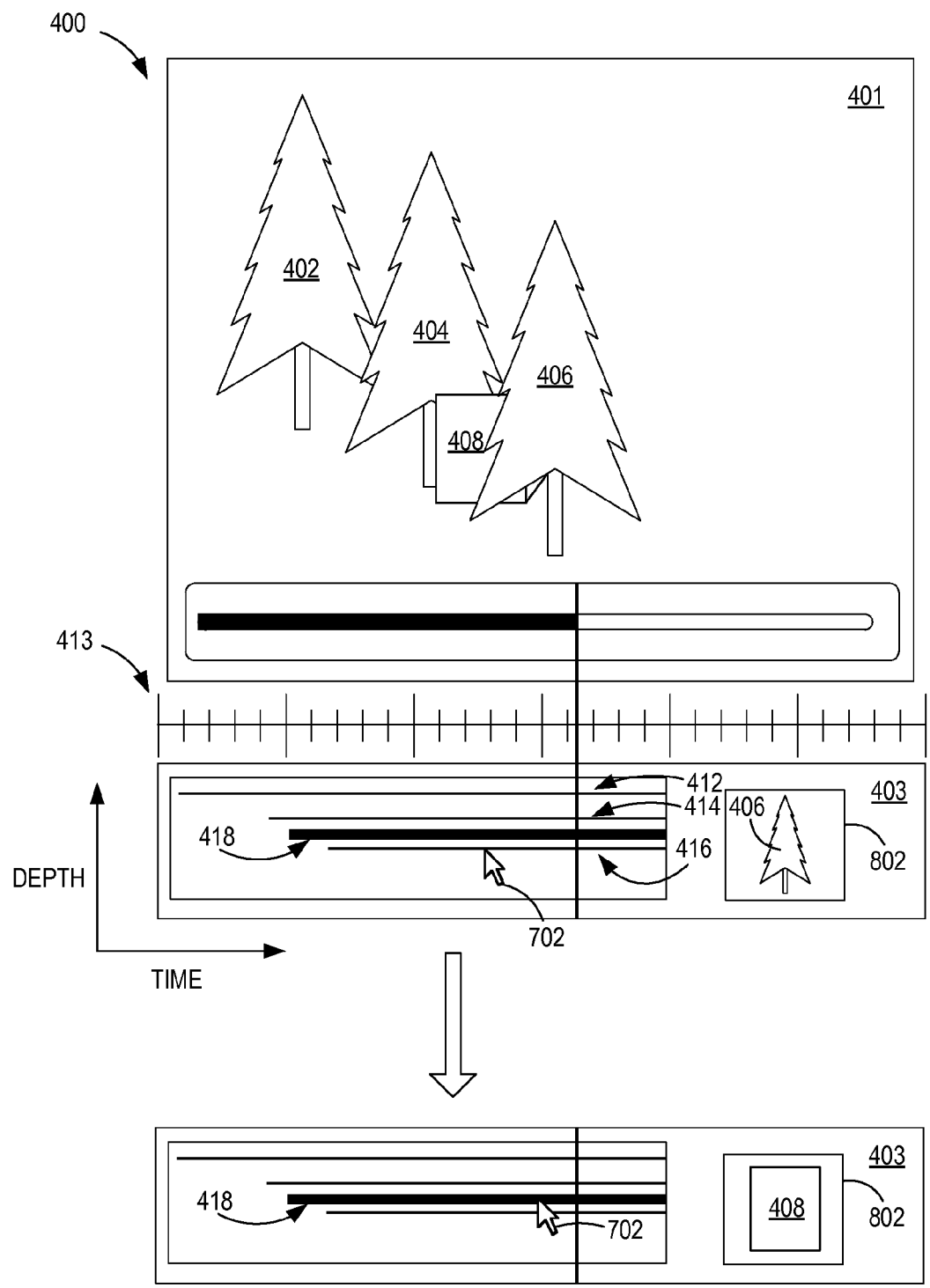

FIG. 8B illustrates another aspect of the highlighting feature associated with the example user interface 400 of FIG. 6 in accordance with various embodiments. For some embodiments, a second display panel 802 located in the control panel 403 may be implemented to facilitate the selection and repositioning of a graphical representation 412, 414, 416, 418. In the example shown, the user causes a mouse pointer 702 to hover over graphical representations 416. This causes an icon or thumbnail image of the corresponding object 406 to be shown in the second display panel 802. In the second example shown at the bottom of FIG. 8B, the user causes the mouse pointer 702 to hover over graphical representation 418, thereby causing an icon or thumbnail image to be displayed in the second display panel 802. Note that the indicator 704 feature discussed in conjunction with FIG. 8A may also be used with the highlighting feature shown in FIG. 8B.

Figure 8C:
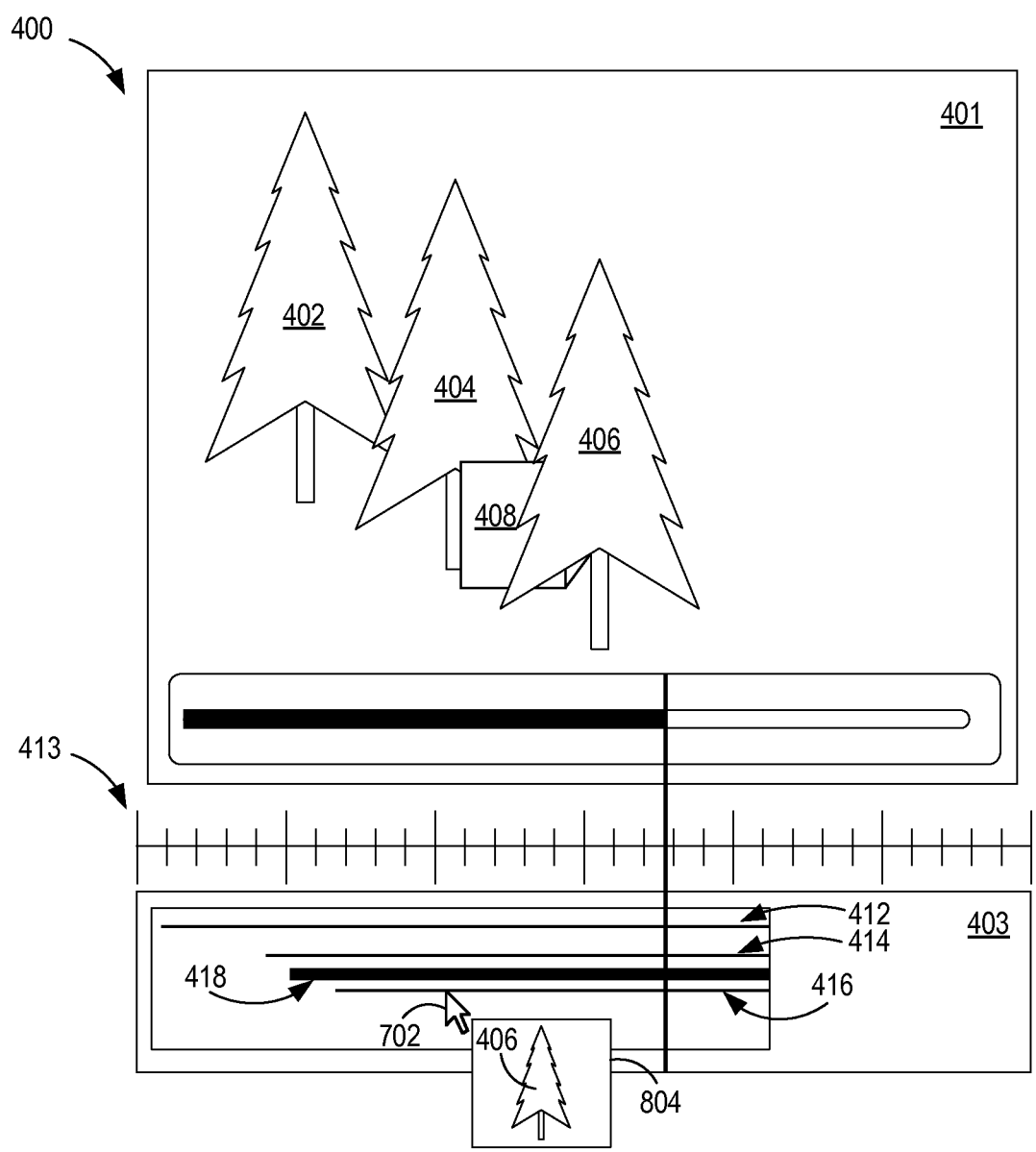

FIG. 8C shows a variation of the highlighting feature in FIG. 8B. For some embodiments, a second display panel 804 similar to the one 802 discussed in connection with FIG. 8B is implemented. However, the position of second display panel 804 is not static and is instead dynamically displayed next to the mouse pointer 702 to further facilitate the selection process.

Figure 9:
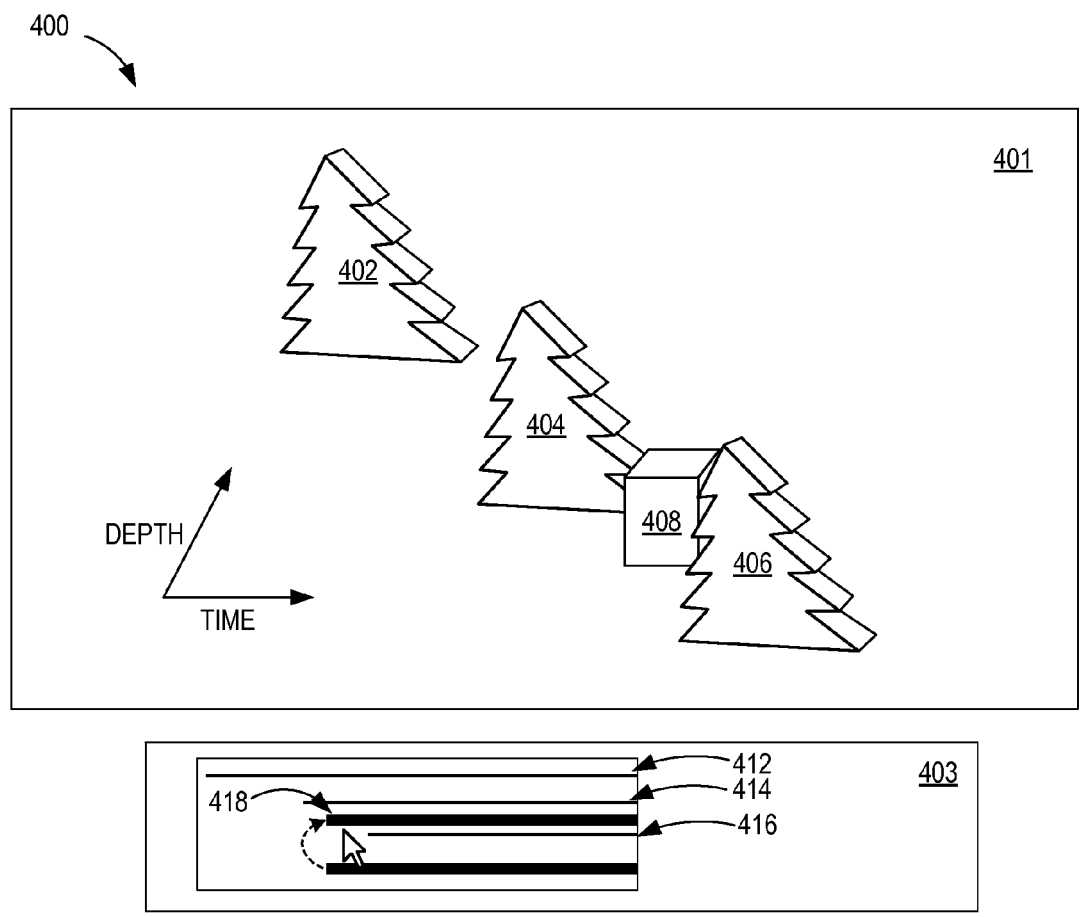
FIG. 9 illustrates an embodiment of the user interface where the user may specify a viewing angle for displaying content in the display panel in accordance with various embodiments of the present disclosure.

Reference is made to FIG. 9, which illustrates an embodiment of the user interface where the user may specify a viewing angle for displaying content in the display panel. With the example user interfaces described earlier, the display panel 401 provides a two-dimensional (2D) view of the existing objects and inserted object. For some embodiments, a different viewing angle may be utilized for facilitating the insertion of one or more objects into a video sequence containing objects with corresponding depth information. In the example shown, the display panel 401 provides depth perception while displaying the objects 402, 404, 406, 408. For some embodiments, the user may also double-click on the timeline to zoom in to a particular portion of the video sequence being edited. Note that the user may specify or adjust the viewing angle via various forms of user input including, but not limited to, user input via navigation of a pointer device such as a mouse, input via a touch panel (e.g., tapping or dragging motion via a finger or stylus), input via a keyboard (e.g., manipulation of a hot key or directional key), an audio input such as a voice command, and so on. For implementations that include a touch panel interface, one or more predefined gestures may also be utilized for specifying the viewing angle.

Figure 10:
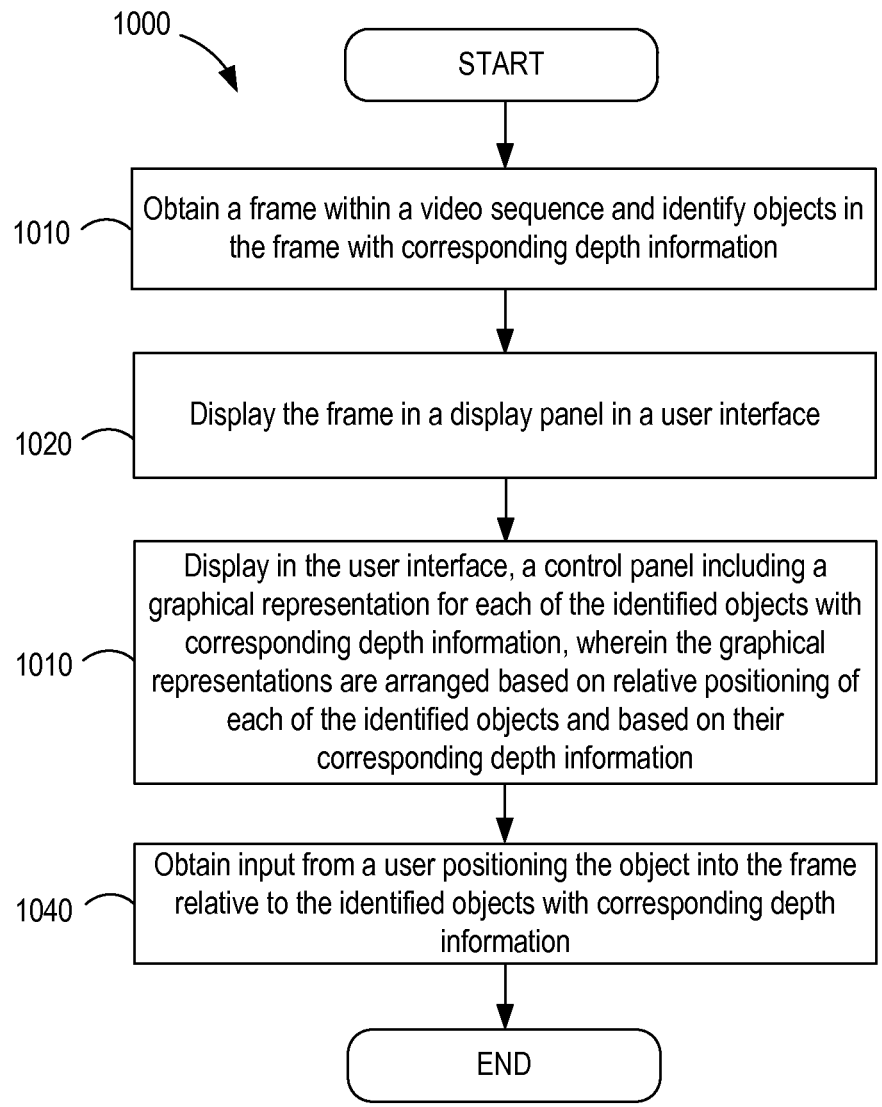
FIG. 10 is a top-level flowchart illustrating examples of functionality implemented as portions of the video editing system of FIG. 1 for facilitating video editing according to various embodiments of the present disclosure.

Reference is made to FIG. 10, which is a flowchart 1000 in accordance with an alternative embodiment for facilitating automatic image editing performed by the video editing system 102 of FIG. 1A. It is understood that the flowchart 1000 of FIG. 10 provides merely an example of the many different types of functional arrangements that may be employed to implement the operation of the various components of the video editing system 102 (FIG. 1A). As an alternative, the flowchart of FIG. 10 may be viewed as depicting an example of steps of a method implemented in the video editing system 102 according to one or more embodiments.

Although the flowchart of FIG. 10 shows a specific order of execution, it is understood that the order of execution may differ from that which is depicted. For example, the order of execution of two or more blocks may be scrambled relative to the order shown. Also, two or more blocks shown in succession in FIG. 10 may be executed concurrently or with partial concurrence. It is understood that all such variations are within the scope of the present disclosure.

Beginning with block 1010, a video sequence 125 (FIG. 1B) to be edited is obtained by the media interface 112 (FIG. 1A), and the object analyzer 126 (FIG. 1B) in the special effects processor 116 (FIG. 1A) analyzes attributes of the video sequence 125. This may comprise, for example, determining whether the video sequence 125 includes one or more existing objects with corresponding depth information.

In block 1020, the user interface component 114 (FIG. 1B) displays the video sequence 125 in a display panel in a user interface. In block 1030, the user interface component 114 facilitates insertion of one or more objects into the video sequence by displaying in the user interface, a control panel including a graphical representation for each of the identified objects with corresponding depth information. The graphical representations are arranged based on relative positioning of each of the identified objects and based on their corresponding depth information.

In block 1040, the user interface component 114 obtains user input that specifies positioning the one or objects into the video sequence 125 relative to the identified objects with corresponding depth information. The special effects applicator 128 (FIG. 1B) applies the special effects to the video sequence 125 to generate an output file 155 (FIG. 1B).

Figure 11:
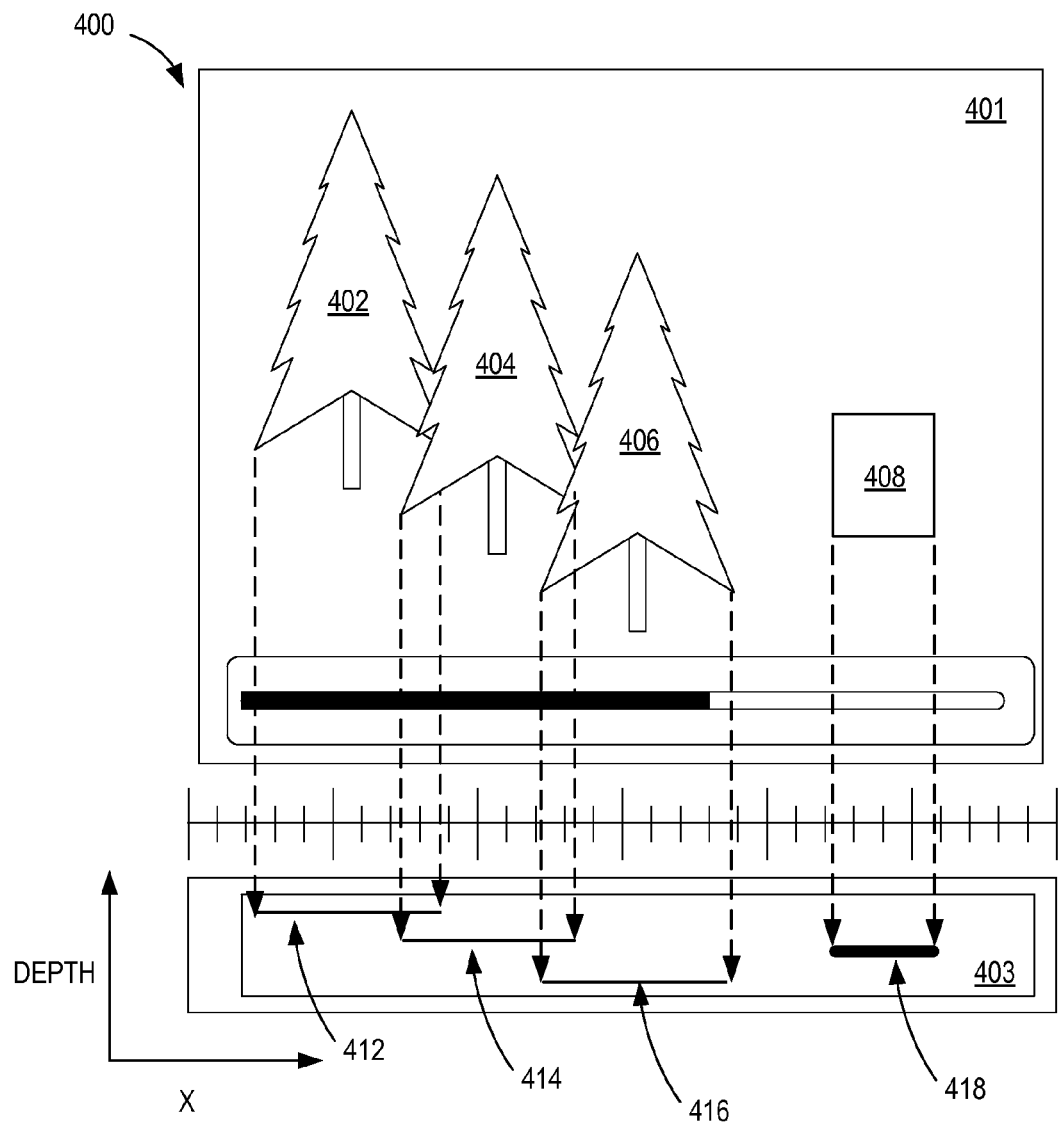
FIGS. 11 and 12 illustrate an alternative embodiment of the user interface used for facilitating the editing of a video sequence.

Reference is made to FIG. 11, which illustrates an alternative embodiment of the user interface used for facilitating the editing of a video sequence. For some embodiments, the control panel 403 includes graphical representations 412, 414, 416, 418 where the size of each graphical representation 412, 414, 416, 418 represents the size of each corresponding object, and where the relative positioning corresponds to depth distance from the camera as well as the relative distance in the x-axis direction between objects 402, 404, 406, 408, as denoted by the dashed lines shown in FIG. 11. The relative positioning of the graphical representations 412, 414, 416, 418 show that object 406 is closest to the camera while object 402 is farthest away from the camera. The inserted object 408 is at a depth that lies between the corresponding depths of object 404 and object 406.

Figure 12:
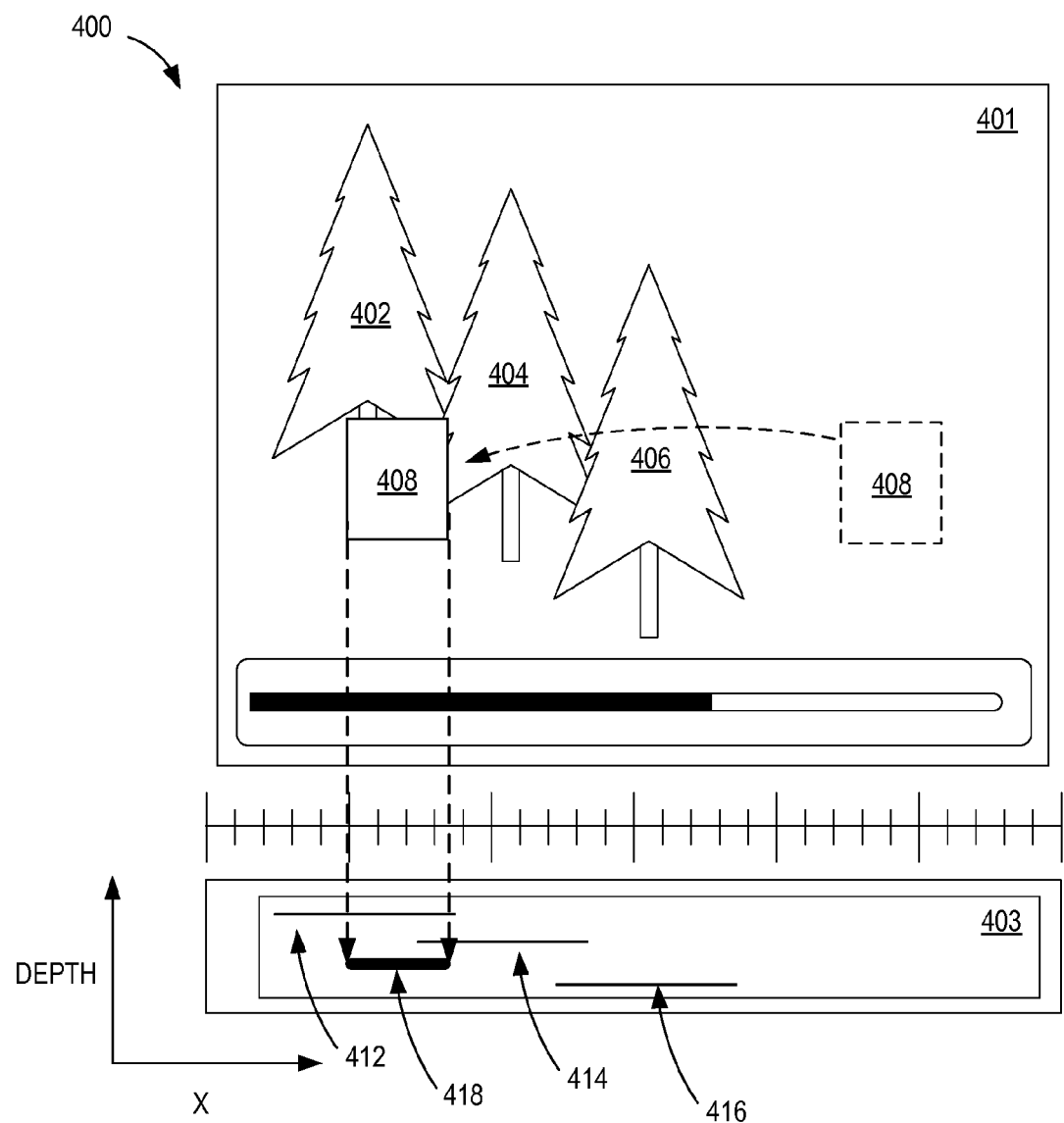

Turning now to FIG. 12, the user again utilizes the control panel 403 to reposition the inserted object 408 by repositioning the corresponding graphical representation 418. In the example shown, the user moves the inserted object 408 between object 402 and object 404 where the inserted object 408 is positioned in front of object 402 and object 404.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method for editing a video in a video editing system, comprising:
    obtaining a video sequence and identifying objects in a frame of the video sequence, the identified objects in the frame each having corresponding depth information;
    displaying the video sequence in a display panel in a user interface;
    facilitating insertion of a new object into the frame of the video sequence by displaying in the user interface, a timeline and a control panel including a graphical representation for each of the identified objects with corresponding depth information, wherein the graphical representations are arranged according to an axis corresponding to time and an axis corresponding to depth; and obtaining input from a user positioning the new object into the video sequence relative to the identified objects with corresponding depth information.

2. The method of claim 1, wherein the graphical representations comprise line objects, and wherein a length of each of the line objects corresponds to a duration of the object depicted in the video sequence.

3. The method of claim 2, wherein a location of each of the graphical representations corresponds to a relative depth of each corresponding object.

4. The method of claim 2, wherein the line objects extend in a horizontal direction along the axis corresponding to time.

5. The method of claim 1, wherein obtaining the user input positioning the object into the video sequence comprises:
displaying a graphical representation of the inserted new object relative to the identified objects with corresponding depth information;
obtaining a position of the inserted new object relative to the identified objects with corresponding depth information; and
based on the obtained position, displaying the new object inserted into the video sequence relative to the identified objects with corresponding depth information.

6. The method of claim 5, wherein obtaining the user input positioning the new object into the video sequence further comprises obtaining a position of the inserted new object relative to the timeline.

7. The method of claim 5, wherein displaying the new object inserted into the video sequence relative to the identified objects with corresponding depth information based on the obtained position comprises displaying the inserted new object occluding or being occluded by the identified objects with corresponding depth information.

8. The method of claim 1, wherein the new object comprises a graphic or text.

9. The method of claim 1, wherein in response to hovering a pointer over a graphical representation in the control panel, the object corresponding to the graphical representation is highlighted to the user.

10. The method of claim 9, wherein the object is highlighted by displaying a graphic on or near the object in the display panel.

11. The method of claim 1, wherein in response to hovering a pointer over a graphical representation in the control panel, the object corresponding to the graphical representation is shown in the form of a thumbnail image in the control panel.

12. The method of claim 1, further comprising obtaining user input specifying a viewing angle for displaying the video sequence in the display panel.

13. The method of claim 12, wherein the user input for specifying the viewing angle comprises at least one of input defined via navigation of a pointing device, input via a touch panel, a keyboard input, and an audio input.

14. The method of claim 1, further comprising dividing the video sequence into additional video sequences according to scene changes, wherein a scene change corresponds to at least a change in depth of at least one object in the video sequence.

15. A method for editing a frame in a video editing system, comprising:
obtaining a frame within a video sequence and identifying objects in the frame with corresponding depth information;
displaying the frame in a display panel in a user interface;
facilitating insertion of a new object into the frame by displaying in the user interface, a control panel including a graphical representation for each of the identified objects with corresponding depth information, wherein the graphical representations are depicted based on object size and relative positioning of each of the identified objects, and based on their corresponding depth information wherein the graphical representations are arranged according to an axis corresponding to time and an axis corresponding to depth; and
obtaining input from a user positioning the new object into the frame relative to the identified objects with corresponding depth information.

16. A system for editing a video, comprising:
a memory comprising program instructions;
a processor coupled to the memory and configured by the program instructions to:
obtain a video sequence;
identify objects in a frame of the video sequence, the identified objects in the frame each having corresponding depth information;
display the video sequence in a display panel in a user interface;
display in the user interface, a timeline and a control panel including a graphical representation for each of the identified objects with corresponding depth information, wherein the graphical representations are arranged according to an axis corresponding to time and an axis corresponding to depth; and
apply a special effect to the video sequence, wherein the special effect comprises positioning of a new object into the video sequence relative to the identified objects with corresponding depth information.

17. The system of claim 16, wherein the graphical representations comprise line objects, wherein a length of the line objects correspond to a duration of the object depicted in the video sequence.

18. The system of claim 17, wherein a location of the graphical representations correspond to a relative depth of each corresponding object.

19. The system of claim 16, wherein the user interface component is further configured to:
display a graphical representation of the inserted new object relative to the identified objects with corresponding depth information;
obtain a position of the inserted new object relative to the identified objects with corresponding depth information; and
based on the obtained position, display the new object inserted into the video sequence relative to the identified objects with corresponding depth information.

20. A non-transitory computer-readable medium embodying a program executable in a computing device, comprising:
code that obtains a video sequence and identifies objects in a frame of the video sequence, the identified objects in the frame each having corresponding depth information;
code that displays the video sequence in a display panel in a user interface;
code that displays in the user interface, a timeline and a control panel including a graphical representation for each of the identified objects with corresponding depth information, wherein the graphical representations are arranged according to an axis corresponding to time and an axis corresponding to depth; and code that obtains input from a user positioning a new object into the video sequence relative to the identified objects with corresponding depth information.

21. The non-transitory computer-readable medium of claim 20, wherein the control panel corresponds to a top view of the objects with corresponding depth information.

22. The non-transitory computer-readable medium of claim 21, wherein spacing between the objects along a first axis represents a relative difference in depth between the objects.

23. The non-transitory computer-readable medium of claim 22, wherein locations and lengths of the objects along a second axis correspond to timing information.

* * * * *